(12) United States Patent
Lin et al.

(10) Patent No.: US 12,511,924 B2
(45) Date of Patent: Dec. 30, 2025

(54) AUTOMATED LABELING OF TRAFFIC CONTROL FEATURES

(71) Applicant: GM Cruise Holdings LLC, San Francisco, CA (US)

(72) Inventors: Chia-Wei Lin, Foster City, CA (US); Juan Fasola, San Francisco, CA (US); Shreyans Kushwaha, Sunnyvale, CA (US); Jabeer Ahmed, Bloomfield, NJ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 301 days.

(21) Appl. No.: 18/482,156

(22) Filed: Oct. 6, 2023

(65) Prior Publication Data
US 2025/0118095 A1    Apr. 10, 2025

(51) Int. Cl.
| | | |
|---|---|---|
| *G06V 20/70* | (2022.01) | |
| *B60W 60/00* | (2020.01) | |
| *G01C 21/00* | (2006.01) | |
| *G06T 7/73* | (2017.01) | |
| *G06V 10/80* | (2022.01) | |
| *G06V 20/56* | (2022.01) | |
| *G06V 20/58* | (2022.01) | |
| *G08G 1/01* | (2006.01) | |

(52) U.S. Cl.
CPC ......... *G06V 20/70* (2022.01); *G01C 21/3815* (2020.08); *G06T 7/74* (2017.01); *G06V 10/803* (2022.01); *G06V 20/582* (2022.01); *G06V 20/584* (2022.01); *G06V 20/588* (2022.01); *G08G 1/01* (2013.01); *B60W 60/001* (2020.02); *B60W 2420/403* (2013.01); *B60W 2420/408* (2024.01); *B60W 2555/60* (2020.02); *G06T 2207/10028* (2013.01); *G06T 2207/30252* (2013.01)

(58) Field of Classification Search
CPC .... G06V 20/70; G06V 10/803; G06V 20/582; G06V 20/584; G06V 20/588; G01C 21/3815; G06T 7/74; G06T 2207/10028; G06T 2207/30252; G08G 1/01; B60W 60/001; B60W 2420/403; B60W 2420/408; B60W 2555/60
See application file for complete search history.

(56) References Cited

U.S. PATENT DOCUMENTS

| | | | | |
|---|---|---|---|---|
| 2013/0010074 A1* | 1/2013 | Takiguchi | .......... | G01C 21/3602 348/46 |
| 2018/0189578 A1* | 7/2018 | Yang | .................. | G01C 21/3635 |

* cited by examiner

*Primary Examiner* — Abhishek Sarma
(74) *Attorney, Agent, or Firm* — CANTOR COLBURN LLP

(57) ABSTRACT

Sensor data obtained from vehicles driving through a particular environment (e.g., a particular city or region being mapped) is used to identify and label traffic control features. Location, speed, and/or acceleration of mapping vehicles can be used to identify intersections that may have traffic control features. Environmental data, such as image data captured by one or more cameras, and point cloud data collected by lidar and/or radar sensors, is used to automatically detect traffic control features at the intersections.

20 Claims, 10 Drawing Sheets

AUTOMATED LABELING OF TRAFFIC CONTROL FEATURES

TECHNICAL FIELD OF THE DISCLOSURE

The present disclosure relates generally to autonomous vehicles and, more specifically, to generating map data used by autonomous vehicles.

BACKGROUND

An autonomous vehicle (AV) is a motorized vehicle that may navigate without a human driver. An exemplary AV may include various sensors, such as a camera sensor, a light detection and ranging (lidar) sensor, and a radio detection and ranging (radar) sensor, among others. The sensors collect data that the AV may use for operations such as positioning and navigation. The sensors may provide the data and measurements to an internal computing system of the AV. The computing system may execute software that uses the data to control one or more mechanical systems of the AV, such as a vehicle propulsion system, a braking system, or a steering system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
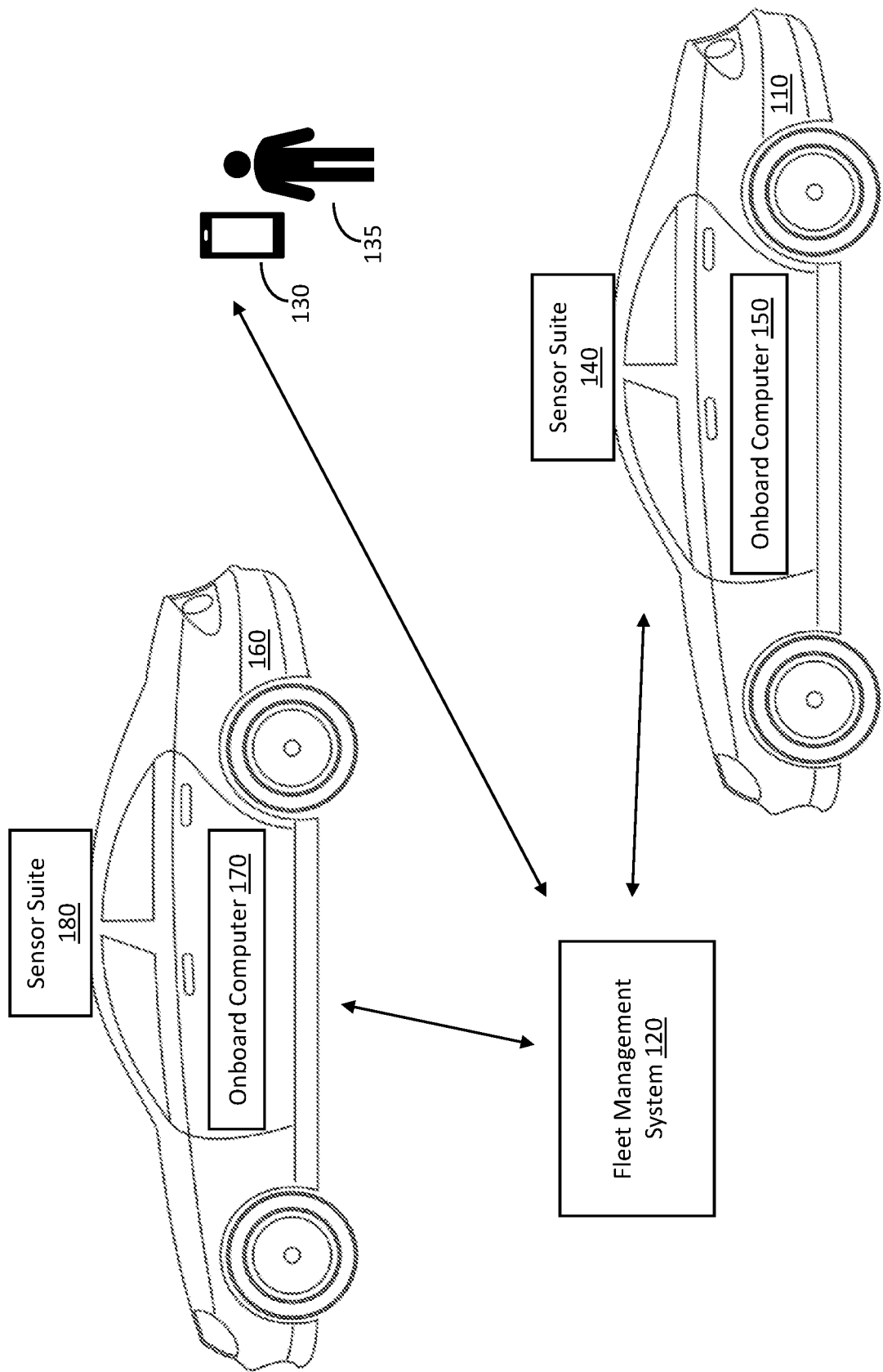
FIG. 1 is a block diagram illustrating a system, including an example AV that may navigate autonomously using a map database and an example mapping vehicle that may capture data used for mapping, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

AVs use a mix of hardware and software to accomplish navigating and driving tasks without a human driver. AVs include computing circuitry in one or more processing units, such as central processing units (CPUs) and/or graphical processing units (GPUs), which run software for processing data and controlling the AV. AVs typically include a variety of sensors to perceive their environment, including radar, lidar, and cameras. These sensors provide a 360-degree view of the AV's surroundings. The sensor data is provided to computing circuitry (e.g., the CPU or GPU), which runs perception software that processes the sensor data and detects pedestrians, other vehicles, and other objects in the AV's environment. This sensor data and/or additional sensor data, such as a global positioning system (GPS) sensor, accelerometer data, etc., can be used by localization software executing on computing circuitry to determine a precise location of the AV. In addition to the real-time sensor data, the AV relies on a highly detailed map to navigate its environment. The map data typically includes data describing routable roadways, such as geospatial information about lanes, and maneuvers that may be performed along or between lanes.

The AV's computing circuitry may execute path planning software, which uses the sensor data, AV location, and local map data to plan a path for the AV to follow. The AV's computing circuitry may also execute control software that generates instructions to control the vehicle's acceleration, braking, and steering based on the planned path, allowing the AV to navigate its environment and avoid any detected obstacles.

It is important for the map data to be accurate so that the AV is aware of the roadway geometry and driving rules and conventions, such as permitted direction of travel and permitted maneuvers through an intersection. In addition to detailed roadway data, the map data may include data describing traffic controls, such as traffic signs (e.g., stop signs) and traffic lights. For example, correct labeling of traffic lights in the map database enables AVs to read the appropriate signal, e.g., to look for a turning arrow signal at the traffic control that signals the current lane of the AV.

Generating detailed map data has previously been a highly manual process. Humans review maps and images of roadways and intersections and code various features of the roadways and intersections. For example, a map database for AVs may include data describing, for a given lane, a direction of travel of the lane, a speed limit of the lane, geometric boundaries of the lane. At an intersection, the map database may include data describing maneuvers that vehicles may make from different lanes (e.g., straight lanes, turning lanes) and paths that vehicles may take through the intersection. The map database may further include data describing the placement and types of traffic signals for controlling vehicle movement through the intersection.

The need to create highly detailed maps for AVs to navigate makes it difficult for AV operators to scale. In particular, the need for detailed maps across a region creates a high bar to introducing AV fleets into new regions, since generating maps using human labeling is resource-intensive and time consuming. Furthermore, errors may be present in human-generated labels.

As described herein, sensor data obtained from vehicles driving through a particular environment (e.g., a particular city or region being mapped) is used to identify and label traffic control features. For example, mapping vehicles may collect data that can be used to populate a map database. The data may include location, speed, and/or acceleration of the vehicle collected as the vehicle navigates a particular environment. The data may further include environmental data, such as image data captured by one or more cameras, and point cloud data collected by lidar and/or radar sensors. The image data and point cloud data may be captured and stored at various points along the mapping car's route, e.g., every meter, every 2 meters, every 5 meters, etc., or at various times, e.g., every tenth of a second or every second.

As used herein, a traffic control feature may include static or dynamic signage and/or static or dynamic lighting for traffic control. For example, traffic control features may include signs directing the flow of traffic, such as stop signs, yield signs, one-way signs, wrong way signs, speed limit signs, etc. In some embodiments, traffic control features may include caution signs, such as signs for animal crossing, pedestrian crossing, merge point, two-lane traffic, etc. In some embodiments, traffic control features include other types of signs directed at vehicles or drivers, such as informative signs (e.g., signs marking highway exits), signs indicating parking restrictions (e.g., no parking zones, reserved parking), etc. Traffic control features may include lights directing the flow of traffic, such as red/yellow/green traffic lights (including round lights and arrow lights), flashing lights (e.g., at pedestrian crossings or four-way stops), etc. Traffic lights may have various formats and combinations, e.g., horizontal or vertical arrangement, or including or not including one or more arrows.

In some embodiments, the location, speed, and/or acceleration data collected by mapping vehicles is used to identify a potential location of a traffic control feature. For example, location data may be assembled into paths indicating the movement of mapping vehicles in the environment. A location where two or more paths cross each other can be identified as an intersection. The speed and/or acceleration behavior of mapping vehicles approaching the identified intersection can be used to determine whether there is a traffic control feature at the intersection, and in some cases, a type or likely type of the traffic control feature. For example, if, for each path into the intersection, the mapping vehicle stopped when approaching the intersection, this may indicate that a stop sign may be at the intersection. As another example, if, for each path into the intersection from a particular direction, some mapping vehicles stop while other mapping vehicles do not stop, this may indicate that a traffic light may be at the intersection, because a portion of the vehicles approached a green light and continued moving and another portion approached a red light and stopped.

After an intersection has been identified (either through the path analysis or through other means, e.g., from a previously generated map, third-party map data, or human labeling), the intersection and sensor data (e.g., image and point cloud data) may be input to a traffic control feature identification system. In some embodiments, a particular software program or module may identify a particular type of traffic signal, e.g., one module may identify stop signs, and another module identify traffic lights. The traffic control feature identification system processes previously collected sensor data, e.g., replaying the collected environmental data using an AV perception software stack. At a particular position approaching the intersection, a potential traffic control feature (e.g., a potential traffic light) may be identified in the image data at a particular portion of an image. The portion of the image may be projected into a point cloud data to identify the portion of the point cloud corresponding to the potential traffic control feature. The portion of the point cloud may then be segmented into subgroups of points or "slices", where each slice is at a different distance or range of distances relative to the position of the mapping vehicle when the data was collected. Features of the slice (e.g., the shape, size, and position) of the slice can be used to determine a confidence level that the slice corresponds to the potential traffic control feature (e.g., a traffic light). If there is uncertainty whether the slice corresponds to the potential traffic control feature, sensor data collected at a later point along the roadway (e.g., two meters closer to the intersection) may be analyzed in a similar manner, and in conjunction with the data collected at earlier points along the roadway.

If the traffic control feature identification system determines that a set of points in the sensor data corresponds to the traffic control feature, the traffic control feature identification system may output data describing the traffic control feature, e.g., a location of the traffic feature, one or more labels (e.g., describing a type of traffic control feature, an orientation of the traffic control feature, a direction of the traffic control feature, etc.). The data describing the traffic control feature may be added to a map database used by AVs for autonomous navigation and path-planning.

As will be appreciated by one skilled in the art, aspects of the present disclosure, in particular aspects of intersection detection and of automated labeling of traffic control features, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of certain specific embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV System

FIG. 1 is a block diagram illustrating a system 100 that includes an example AV 110 that may drive autonomously using a map database and an example mapping vehicle 160 that may capture data used for mapping, according to some embodiments of the present disclosure. The system 100 may further include a fleet of AVs that are similar to the AV 110, a fleet management system 120, and a user device 130. The AV 110 may include a sensor suite 140 and an onboard computer 150. Other AVs in the AV fleet may also include the sensor suite 140 and onboard computer 150. A single AV in the fleet is referred to herein as AV 110, and the fleet of AVs is referred to collectively as AVs 110.

The AV 110 may be a fully autonomous automobile, but may additionally or alternatively be any semi-autonomous or fully autonomous vehicle, e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV 110 (or any other movement-retarding mechanism); and a steering interface that controls steering of the AV 110 (e.g., by changing the angle of wheels of the AV 110). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar (radio detection and ranging), sonar (sound detection and ranging), lidar (light detection and ranging), GPS sensors, wheel speed sensors, inertial measurement units (IMUs), accelerometers, microphones, strain gauges, pressure monitors, barometers, thermometers, altimeters, etc. The sensors may be located in various positions in and around the AV 110. Several example components of the sensor suite 140 are described with respect to FIG. 2.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. For example, the onboard computer 150 maneuvers the AV 110 according to routing selections determined by an onboard or remote navigation system.

The onboard computer 150 may rely on detailed map data to control the AV 110. For example, the map data may include traffic control features on the roadway, and the AV 110 may plan a path according to the traffic control features. For example, if the map data indicates that a stop sign is at an intersection that the AV 110 is approaching, the onboard computer 150 determines a path that includes slowing down when approaching the stop sign and stopping at the stop sign. If the map data indicates that a traffic light controls an intersection that the AV 110 is approaching, the onboard computer 150 determines a state of the traffic light (e.g., whether a red, yellow, or green light is illuminated) based on data from the sensor suite 140, and the onboard computer 150 determines a path for the AV 110 (e.g., whether to slow down, stop, or proceed through the intersection) based on the state of the traffic light.

The onboard computer 150 is preferably a general-purpose computer adapted for I/O communication with vehicle control systems and sensor suite 140, but the onboard computer 150 may additionally or alternatively be any suitable computing device, or a group of computing devices. The onboard computer 150 may transmit data to and receive data from other AV components via one or more local networks on the AV. The onboard computer 150 is preferably connected to the Internet via a wireless connection (e.g., via a cellular data connection). Additionally or alternatively, the onboard computer 150 may be coupled to any number of wireless or wired communication systems.

The mapping vehicle 160 may also include a sensor suite 170 and an onboard computer 180. The sensor suite 170 may be similar to the sensor suite 140. For example, the sensor suite 170 may include at least a portion of the sensors of the sensor suite, e.g., location sensors (e.g., GPS sensors), movement sensors (e.g., sensors for collecting one or more of speed, acceleration, jerk, etc.), and computer vision sensors (e.g., camera, radar, lidar, etc.). The onboard computer 180 may control the sensor suite 170 (e.g., instruct collection of data), receive data from the sensor suite 170, store the received data, and transmit data to the fleet management system 120. The onboard computer 180 may be adapted for communication with internal systems of the mapping vehicle 160 (e.g., the sensor suite 170) and the fleet management system 120, in a similar manner to the onboard computer 150.

The mapping vehicle 160 may be a conventional vehicle that is driven by a human. The mapping vehicle 160 or the fleet management system 120 may determine a route for the mapping vehicle 160 to collect data within a particular city or region. The system 100 may include multiple mapping vehicles 160, which may be referred to as a fleet of mapping vehicles 160.

The fleet management system 120 manages the fleet of AVs 110 and the mapping vehicles 160. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task and instruct the selected AV to autonomously drive to a particular location (e.g., a pickup address or a delivery address). The fleet management system 120 may select a route for the AV 110 to follow. The fleet management system 120 also may manage fleet maintenance tasks, such as charging and servicing of the AVs 110.

As shown in FIG. 1, the AV 110 and mapping vehicle 160 may communicate with the fleet management system 120. The vehicles 110 and 160 may connect to and communicate with the fleet management system 120 over a public network, such as the Internet. More specifically, the fleet management system 120 may receive and transmit data via one or more appropriate devices and network from and to the AV 110 and/or mapping vehicle 160, such as by wireless systems, such as a wireless local area network (WLAN) (e.g., an IEEE 802.11 based system), a cellular system (e.g., a wireless system that utilizes one or more features offered by the 3rd Generation Partnership Project (3GPP), including General Packet Radio Service (GPRS)), and the like.

The user device 130 may be a personal device of the user 135, e.g., a smartphone, tablet, computer, or other device for interfacing with a user of the fleet management system 120. The user device 130 may provide one or more applications (e.g., mobile device apps or browser-based apps) with which the user 135 can interface with a service that provides or uses AVs. The service, and the AVs 110 associated with the service, may be managed by the fleet management system 120, which may also provide the application to the user device 130. In other embodiments, the service may be managed by a separate system (e.g., a food delivery service) that relies on the AV fleet for some or all of its transportation tasks and interacts with the fleet management system 120 to arrange transportation tasks.

Example AV Sensor Suite

Figure 2:
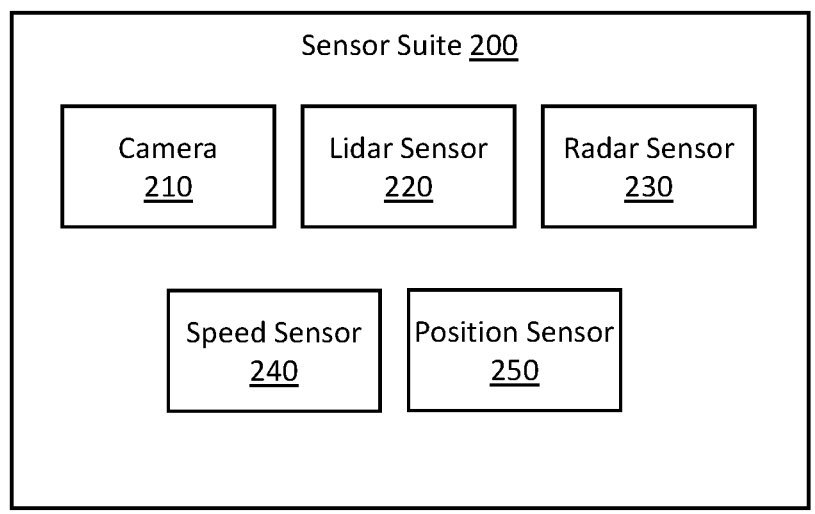
FIG. 2 is a block diagram illustrating various sensors that may be included in a sensor suite of a vehicle, according to some embodiments of the present disclosure.

FIG. 2 is a block diagram of a sensor suite 200, according to some embodiments of the present disclosure. FIG. 2 includes various sensors that may be included in a sensor suite of a vehicle. The sensor suite 200 includes a set of environmental sensors, e.g., a camera 210, a lidar sensor 220, a radar sensor 230. The sensor suite 200 further includes a speed sensor 240 and a location sensor 250. While one of each of the sensors 210, 220, 230, 240, and 250 is shown in FIG. 2, the sensor suite 200 may include more than one of each of these components, e.g., to capture the environment from different positions and angles, or for redundancy.

The sensor suite 200 may be the sensor suite 140 of the AV 110, or the sensor suite 170 of the mapping vehicle 160. In general, at least a portion of the data captured by the sensor suites 140 and 170 may be similar, e.g., each of the sensor suites 140 and 170 may capture image data, lidar data, radar data, speed data, and location data, etc. The sensor suites 140 and 170 may include some similar or identical components, as described further below.

The sensor suite 200 includes multiple types of environmental sensors, each of which has different attributes and advantages. Combining data from multiple sensors and different sensor types allows an AV (e.g., the AV 110) or a mapping vehicle (e.g., the mapping vehicle 160) to obtain a more complete view of its environment. For example, combining data from multiple sensors and different types of sensors allows a vehicle to learn about its environment in different conditions, e.g., at different travel speeds, and in different lighting conditions.

Different and/or additional components not shown in FIG. 2 may be included in the sensor suite 200. For example, the sensor suite 200 may also include photodetectors, sonar, GPS, wheel speed sensors, IMUs, accelerometers, microphones, strain gauges, pressure monitors, barometers, thermometers, altimeters, etc., as described with respect to the sensor suite 140 of FIG. 1. In some embodiments, a single sensor or set of sensors may obtain location and speed data, e.g., the sensor suite 200 may include one or more IMUs and GPS sensors, which collect data that can be used to derive speed and location.

The camera 210 captures images of the environment around the vehicle (e.g., the AV 110 or the mapping vehicle 160). The sensor suite 200 may include multiple cameras 210 to capture different views, e.g., a front-facing camera, a back-facing camera, and side-facing cameras. The cameras 210 may be implemented using high-resolution imagers with fixed mounting and field of view. One or more cameras 210 may capture light at different frequency ranges. For example, the sensor suite 200 may include one or more infrared cameras and/or one or more ultraviolet cameras in addition to visible light cameras. The AV 110 and the mapping vehicle 160 may have cameras 210 mounted at similar locations. In some embodiments, the same camera hardware is used for the AV 110 and the mapping vehicle 160. In some cases, the mapping vehicle 160 may include cameras with higher resolution and/or more cameras than the AV 110, or vice versa.

The lidar sensor 220 measures distances to objects in the vicinity of the AV 110 or the mapping vehicle 160 using reflected laser light. The lidar sensor 220 may be a scanning lidar that provides a point-cloud of the region scanned. The lidar sensor 220 may have a fixed field of view or a dynamically configurable field of view. The AV 110 and the mapping vehicle 160 may each have one or more lidar sensors 220 mounted at similar locations on the vehicles, e.g., on the top of the AV 110 and the top of the mapping vehicle 160. In some embodiments, the same lidar hardware is used for the AV 110 and the mapping vehicle 160. In some cases, the mapping vehicle 160 may include a lidar sensor with higher resolution and/or more lidar sensors than the AV 110, or vice versa.

The radar sensor 230 measures ranges and speeds of objects in the vicinity of the AV 110 or the mapping vehicle 160 using reflected radio waves. The radar sensor 230 may be implemented using a scanning radar with a fixed field of view or a dynamically configurable field of view. As described with respect to the cameras 210, the sensor suite 200 may include multiple radar sensors 230 to capture different fields of view. Radar sensors 230 may include articulating radar sensors, long-range radar sensors, short-range radar sensors, or some combination thereof. The AV 110 and the mapping vehicle 160 may each have one or more radar sensors 230 mounted at similar locations on the vehicles. In some embodiments, the same radar hardware is used for the AV 110 and the mapping vehicle 160. In some cases, the mapping vehicle 160 may include radar sensors with higher resolution and/or more radar sensors than the AV 110, or vice versa.

In some embodiments, other types of time-of-flight sensors, such as time-of-flight cameras, infrared depth sensors, 3D scanners, structured light scanners, or other types of ranging techniques are used in addition to or instead of lidar and/or radar. Any time-of-flight sensor or ranging sensor may provide data in the form of a point cloud, or data (e.g., range data) from which a point cloud may be derived. Point cloud data is described further in relation to FIG. 3.

The speed sensor 240 measures a traveling speed of the AV 110 or the mapping vehicle 160. The speed sensor 240 may be the vehicle speedometer, e.g., a mechanical or electronic speedometer. The speed sensor 240 may be coupled to wheel sensors for measuring rotation of the vehicle's wheels. In other embodiments, the speed sensor 240 may calculate speed based on distance traveled by the vehicle over time (e.g., using data from a positioning system) and/or based on data from an onboard accelerometer or IMU that measures vehicle acceleration. In some embodiments, an accelerometer and/or IMU is included in the sensor suite 200 instead of or in addition to the speed sensor 240.

The location sensor 250 determines a current location of the AV 110 or the mapping vehicle 160. The location sensor 250 may include or be coupled to a GPS sensor and one or more IMUs and/or accelerometers. The location sensor 250 may include a processing unit (e.g., a module of the onboard computer 150 or 180, or a separate processing unit) that receives signals (e.g., GPS data and IMU data) to determine the current location of the AV 110 or the mapping vehicle 160.

Example Point Cloud Data

Figure 3:
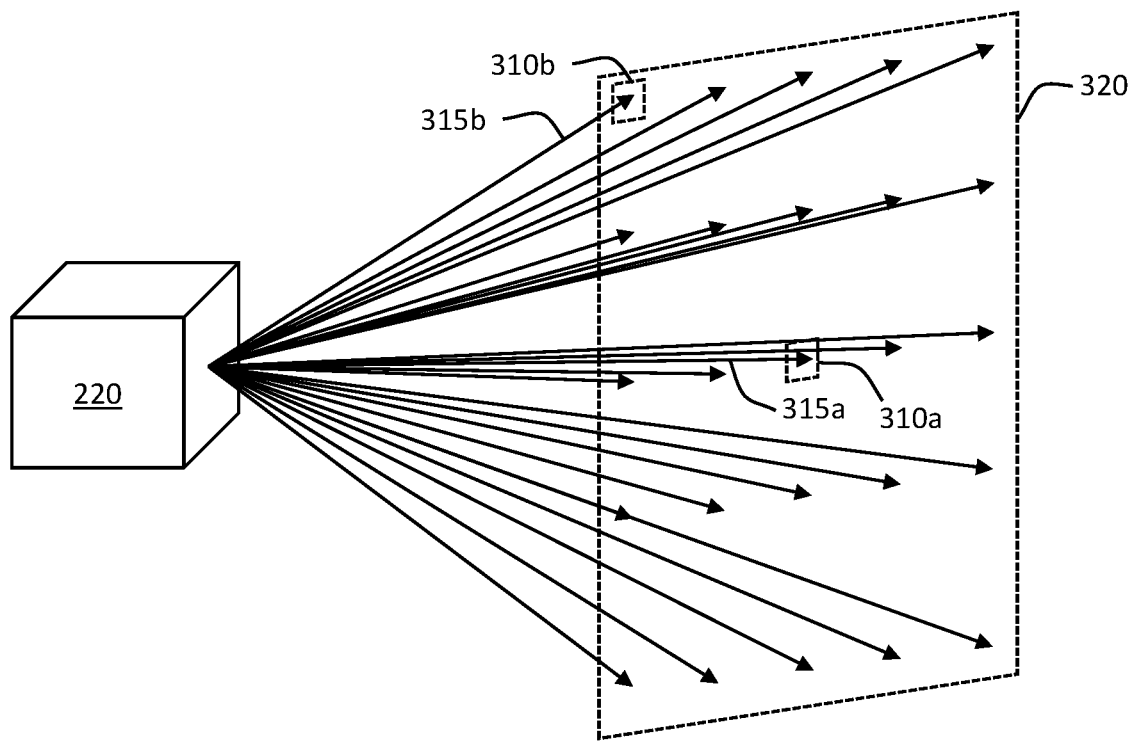
FIG. 3 illustrates ray directions of pixels of a sensor, according to some embodiments of the present disclosure.

FIG. 3 illustrates ray directions of pixels of a sensor, according to some embodiments of the present disclosure. A point cloud obtained by a sensor or derived from sensor data (e.g., ranging data), such as data from the lidar sensor 220 or radar sensor 230, may be arranged as a set of pixels, e.g., the pixels 310*a* and 310*b*, within a given frame, e.g., the frame 320. Each pixel 310 has an associated ray direction 315, where the ray direction 315 points outwards from the sensor (in this example, the lidar sensor 220). The ray directions 315 are projected towards the frame 320. While 25 rays and pixels are shown in FIG. 3, it should be understood that the lidar sensor 220 may have many more pixels. Furthermore, while the frame 320 has a square shape in the example shown in FIG. 3, the frame 320 may have other shapes in other embodiments. For example, the frame 320 may include a 360° view around a vehicle (e.g., the AV 110 or the mapping vehicle 160).

In the example of FIG. 3, a first pixel 310*a* has a ray direction 315*a* that extends straight out from the lidar sensor 220; the pixel 310*a* is in the center of the frame 320. A second pixel 310*b* at a corner of the frame 320 is associated with a ray direction 315*b* that extends out from the lidar sensor 220 at, for example, a 30° angle in both an x-direction and y-direction from the center of the frame 320, where the frame 320 is an x-y plane in a frame of reference of the lidar sensor 220. While FIG. 3 illustrates the rays 315 extending from a single point on the lidar sensor 220, in other embodiments, rays 315 may extend from different points (e.g., from different positions around the lidar sensor 220 if the lidar sensor 220 captures a 360° view.

The lidar sensor 220 may capture distance data (e.g., as a distance or one or more phase shifts) to a surface along each pixel's ray. In one example, the first pixel 310*a* may have a measured distance of 5 meters representing a distance to a particular point on a stop sign, and the second pixel 310*b* may have a measured distance of 10 meters representing a distance to a particular point on a tree behind the stop sign. Additional examples of rays to objects at different distances to the lidar sensor 220 are provided in FIGS. 7, 8, and 11. The captured distance data and the ray directions may be used to generate a point cloud that represents the positions of objects relative to the lidar sensor 220 in a three-dimensional space.

Example Fleet Management System

Figure 4:
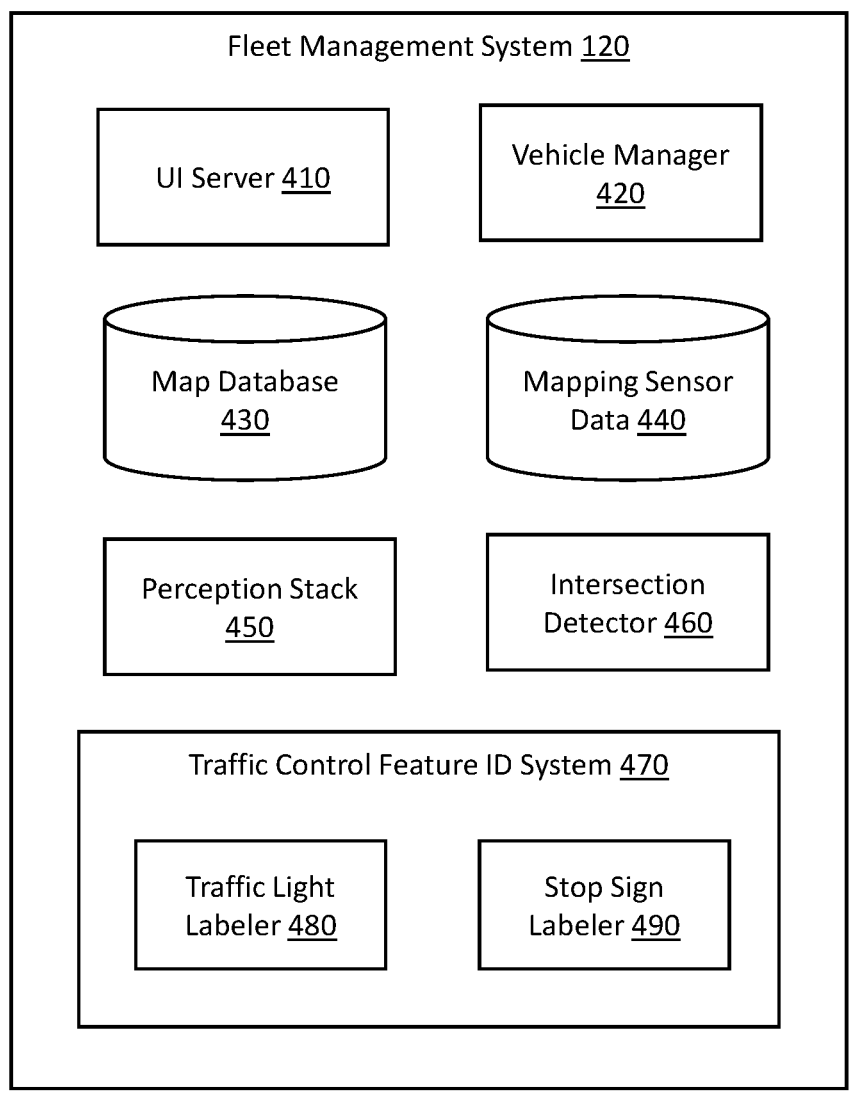
FIG. 4 is a block diagram illustrating various components that may be included in the fleet management system, according to some embodiments of the present disclosure.

FIG. 4 is a block diagram illustrating various components that may be included in the fleet management system 120, according to some embodiments of the present invention. The fleet management system 120 includes a user interface (UI) server 410, a vehicle manager 420, a map database 430, mapping sensor data 440, a perception stack 450, an intersection detector 460, and a traffic control feature ID system 470. In alternative configurations, different, fewer, and/or additional components may be included in the fleet management system 120. In this example, the traffic control feature ID system 470 includes a traffic light labeler 480 and a stop sign labeler 490. The labelers 480 and 490 are provided as examples; in other examples, the traffic control feature ID system 470 may include additional or alternative modules for labeling different types of traffic control features, e.g., any of the traffic control features described above.

The UI server 410 is configured to communicate with client devices, such as user device 130, that provide a user interface to users. For example, the UI server 410 may be a web server that provides a browser-based application to client devices, or the UI server 410 may be a mobile app server that interfaces with a mobile app installed on client devices. The user interface enables the user to access a service of the fleet management system 120, e.g., to request a ride from an AV 110, or to request a delivery from an AV 110. In some embodiments, the UI server 410 or another UI server (e.g., a mapping UI server) provides a UI for a driver of the mapping vehicle 160 with instructions for where to drive the mapping vehicle 160 to obtain data for generating a map.

The vehicle manager 420 manages and communicates with a fleet of AVs, e.g., the AV 110. The UI server 410 transmits service requests received from users to the vehicle manager 420, and the vehicle manager 420 assigns AVs to the service requests. More broadly, the vehicle manager 420 directs the movements of the AVs 110 in the fleet. For example, the vehicle manager 420 may instruct an AV 110 to drive to a particular location while not servicing a user, e.g., to improve geographic distribution of the fleet, to anticipate demand at a particular location, to drive to a charging station for charging, etc. The vehicle manager 420 also instructs AVs 110 to return to AV facilities for recharging, maintenance, or storage.

The vehicle manager 420 or another vehicle manager (e.g., a mapping vehicle manager) may interface with mapping vehicles, e.g., the mapping vehicle 160. For example, the vehicle manager 420 may determine a particular route for the mapping vehicle 160 to map and instruct a driver of the mapping vehicle 160 to drive the route to collect data, e.g., via the UI server 410, as described above. The vehicle manager 420 may receive data captured by a mapping vehicle 160 (e.g., by the sensor suite 170) and store the captured data as mapping sensor data 440.

The map database 430 stores a detailed map describing roads and other areas (e.g., parking lots, AV service facilities) that may be traversed by the fleet of AVs 110. An AV 110 uses data in the map database 430 to navigate its environment. For example, the AV 110 may download a portion of the map database 430 describing the present surroundings of the AV 110, e.g., map data for the city or region the AV 110 is in, or map data for a planned route of the AV 110. The map database 430 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, parking lots, etc. The map database 430 also includes data describing traffic control features, such as data describing the locations and types of traffic lights and stop signs. The traffic control feature data may be at least partially generated the traffic control feature ID system 470, as described below.

The mapping sensor data 440 is the data received from mapping vehicles, e.g., the mapping vehicle 160. The mapping sensor data 440 can be used to determine map features for the map database 430. The mapping sensor data 440 may include any of the data obtained by the sensor suite 200 described above, e.g., image data, lidar and/or radar point clouds, speed data, and position data. The mapping sensor data 440 may be time stamped or associated with another label so that data from different sensors obtained at a particular time and/or position are associated with each other.

The perception stack 450 is a software stack that enables an AV (e.g., the AV 110) to perceive its environment based on sensor data, e.g., data from the sensor suite 200. For example, the perception stack 450 can "see" an environment via cameras, lidar, radar, etc. In some embodiments, the perception stack 450 may "feel" an environment based on data from pressure sensors, force sensors, impact sensors, etc., and the perception stack 450 may "hear" the environment based on data from microphones, ultrasonic sensors, etc. The perception stack 450 may detect and classify objects and determine their current and predicted locations, speeds, directions, and the like. In addition, the perception stack 450 may determine the free space around a vehicle, e.g., the AV 110 or the mapping vehicle 160. The perception stack 450 may also identify environmental uncertainties, such as where to look for moving objects, flag areas that may be obscured or blocked from view, and so forth.

A version or instance of the perception stack 450 may be executed by the onboard computer 150 of the AV 110 to enable autonomous driving. In this example, the perception stack 450 is also executed by the fleet management system 120. The perception stack 450, or some components of the perception stack 450, may be utilized by the traffic control feature ID system 470 to process mapping sensor data 440 from mapping vehicles 160, e.g., to analyze an image and detect features within the image, and to analyze a point cloud and detect features within the point cloud, as described further below.

The intersection detector 460 is programmed to identify intersections between roadways. The intersection detector 460 may retrieve and process mapping sensor data 440 to determine the locations of intersections based on paths driven by the mapping vehicles 160. For example, if the path of a first mapping vehicle crosses the path of a second mapping vehicle, there may be an intersection at the location where the vehicles cross paths. The traffic control feature ID system 470 may identify traffic control at intersections identified by the intersection detector 460. An example process performed by the intersection detector 460 is described with respect to FIGS. 14 and 15.

The traffic control feature ID system 470 identifies and labels traffic control features, such as traffic control signs and lights, as described above. The traffic control feature ID system 470 may retrieve and process mapping sensor data 440 to automatically detect traffic control features in the collected mapping sensor data 440. In this example, the traffic control feature ID system 470 includes a traffic light labeler 480 to identify and label traffic lights, and a stop sign labeler 490 to identify and label stop signs. As noted above, in other embodiments, the traffic control feature ID system 470 may include additional or alternative labelers for different types of traffic control features, e.g., labelers for yield signs, speed limit signs, pedestrian crossing signs, pedestrian crossing lights, etc. In some embodiments, a single labeling component may be able to detect and label multiple types of traffic control features, e.g., a light labeler that can detect any light used for traffic control (e.g., traffic lights, pedestrian crossing lights, warning lights, etc.).

The components 450, 460, 480, and 490 of the fleet management system 120 may be implemented as software programs or software modules that execute on a server or another computing device, or across multiple computing devices (e.g., in a cloud computing environment). Instructions for executing the software programs or modules may be stored on one or more memories accessible to the fleet management system 120, e.g., an integrated memory of a server, or a separate memory device coupled to a server (e.g., cloud storage in a cloud computing environment).

Example Process for Detecting and Labeling Traffic Control Features

Figure 5:
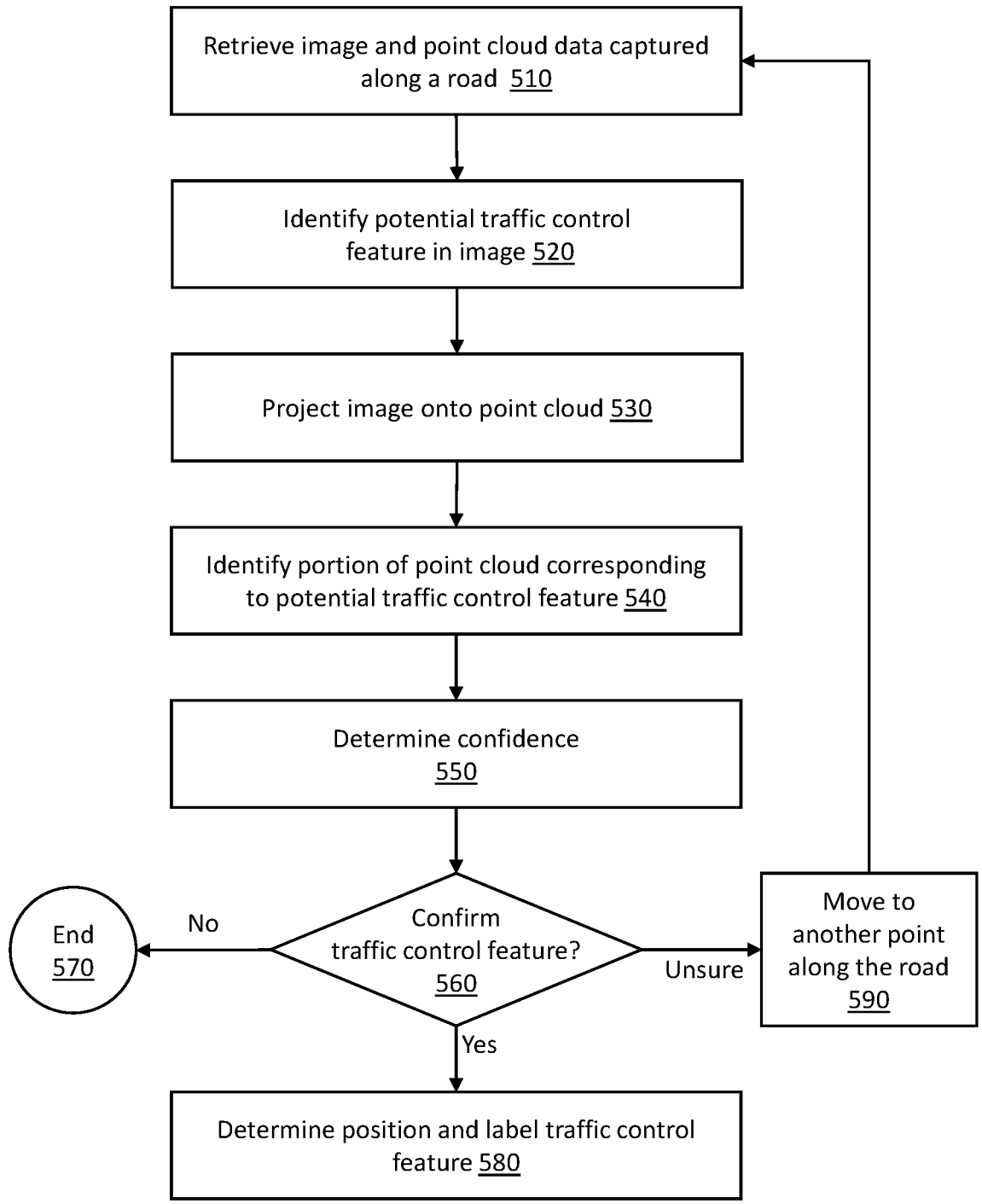
FIG. 5 is a flow chart of a process for labeling traffic control features based on captured sensor data, according to some embodiments of the present disclosure.

FIG. 5 is a flow chart of a process 500 for labeling traffic control features based on captured sensor data, according to some embodiments of the present disclosure. The process 500 may be performed by any labeler of the traffic control feature ID system 470, e.g., the traffic light labeler 480 or the stop sign labeler 490. FIGS. 6-13 help illustrate various steps in the process 500, with reference to the particular example of stop sign labeling performed by the stop sign labeler 490.

A labeler (e.g., the traffic light labeler 480 or the stop sign labeler 490) retrieves 510 image and point cloud data captured along a roadway. For example, the labeler receives data identifying an intersection from the intersection detector 460, and the labeler retrieves image and point cloud data from the mapping sensor data 440 captured by a mapping vehicle 160 driving towards the identified intersection. Alternatively, other information identifying an intersection (e.g., from the map database 430 or a selection by a user) may be accessed by the labeler or provided to the labeler. In some embodiments, the intersection detector 460 or another data source provides data describing the intersection type or a potential intersection type (e.g., four-way stop, two-way stop, traffic light, etc.), and the traffic control feature ID system 470 instructs the relevant labeler to perform the process 500 (e.g., the stop sign labeler 490 if an identified intersection is described as being a four-way stop).

The retrieved image and point cloud data is captured at a particular location along the roadway. For example, the image and point cloud data may have been captured from a specified distance away from the intersection, e.g., approximately 50 meters or 20 meters away from the intersection, while the mapping vehicle 160 was approaching the intersection.

The labeler analyzes the retrieved image data to identify 520 a potential traffic control feature in an image. For example, the mapping sensor data 440 includes one or more images from a camera or cameras directed frontwards from the mapping vehicle 160. The labeler processes this image or images to visually identify the traffic control feature in the image(s). The labeler may use any object detection algorithm, e.g., an image segmentation and classification algorithm. For example, a machine-learning model for detecting a particular traffic control feature may be trained based on a labeled or unlabeled training data set that includes other instances of the particular traffic control feature. The object detection algorithm may identify multiple instances of the traffic control feature (e.g., multiple traffic lights) in the image, and determine the number and location of the traffic control feature. In some embodiments, rather than having a labeler for detecting a particular traffic control feature (e.g., the labelers 480 and 490), the traffic control feature ID system 470 may include a multi-class classification model that can detect and identify multiple different types of traffic control features. As noted above, the labeler may work in conjunction with or utilize components of the perception stack 450. The perception stack 450, or a subcomponent of the perception stack 450 (e.g., an object detection algorithm of the perception stack 450), may be used to identify the potential traffic control feature in the image.

Figure 6:
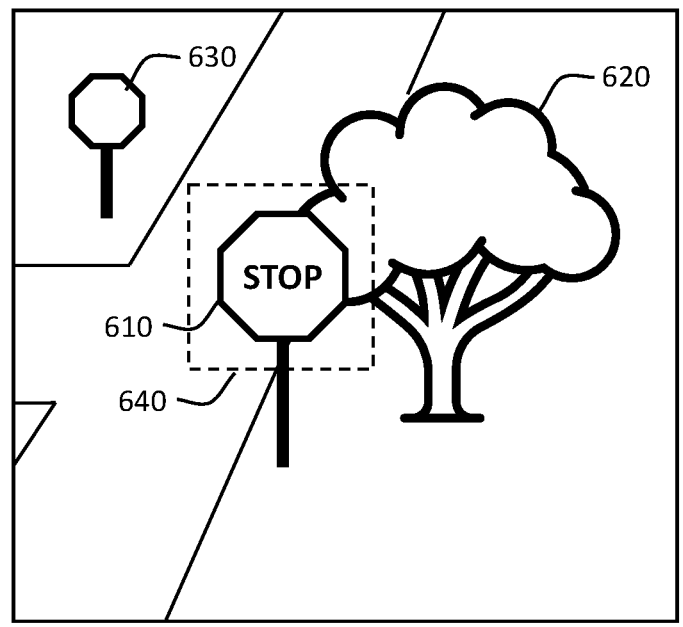
FIG. 6 is an example image captured by a camera, according to some embodiments of the present disclosure.

FIG. 6 is an example illustration of an image captured by a mapping vehicle 160 approaching a three-way intersection. The image is captured by a camera 210 of a mapping vehicle 160 approaching the stop sign 610. A tree 620 is located behind the stop sign 610. A second stop sign 630 controls traffic from the opposite direction. In this example, an object detection algorithm for detecting stop signs may detect the stop signs 610 and 630, e.g., based on their octagonal shapes. In some cases, the object detection algorithm may be trained to detect objects that have an octagonal shape, are mostly red, and say the word "STOP"; in this case, the object detection algorithm may only identify the stop sign 610, since the red side and the word "STOP" of the stop sign 630 are facing away from the camera 210 and thus not captured by the image.

In some embodiments, the labeler may use heuristics to identify relevant features of the image. For example, the labeler may consider the relative sizes of potential traffic control features to identify one or more traffic control features that control traffic into the intersection from the direction of the mapping vehicle 160. In the example of FIG. 6, the stop sign labeler 490 may use the relative sizes of the stop signs 610 and 630 to determine that the stop sign 610, which appears larger in the image, is likely to be the stop sign controlling traffic from the direction of the mapping vehicle 160, while the smaller stop sign 630 (that is, smaller in the image) is likely to control traffic from a different direction. In this case, the labeler identifies the region 640 as including a potential stop sign for controlling traffic from the direction of the mapping vehicle 160.

The labeler projects 530 the image with the identified traffic control feature onto the point cloud. For example, a portion of the image including the identified potential traffic control feature (e.g., the region 640) may be projected into a point cloud that was obtained by the sensor suite 200 (e.g., by the lidar sensor 220) at the same location where the image was obtained. The labeler may use the projection to determine which points in the point cloud correspond to the identified portion of the image. The perception stack 450 may include software components for fusing data from different sensors, and may include components suitable for projecting the image into the point cloud. Thus, in some embodiments, the perception stack 450, or a subcomponent of the perception stack 450, may be used to project the image, or a portion of the image, onto the point cloud.

Figure 7:
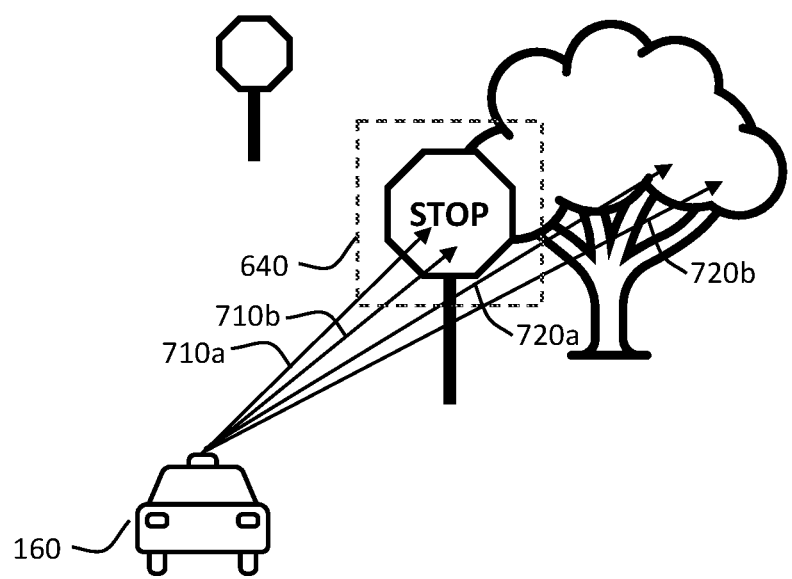
FIG. 7 is an example illustration of point cloud data collected by the mapping vehicle, according to some embodiments of the present disclosure.

FIG. 7 is an example illustration of point cloud data collected by the mapping vehicle, according to some embodiments of the present disclosure. A portion of the image data is projected onto the point cloud. In particular, the region 640 that includes the potential stop sign is projected into the point cloud. Several example rays extending from the lidar sensor and passing through the projected region 640 are illustrated in FIG. 7. Two rays 710a and 710b are reflected off the stop sign, and two rays 720a and 720b are reflected off the tree. It should be understood that many more points are in the portion of the point cloud corresponding to the projected region 640, but the rays of only four points are illustrated.

Figure 8:
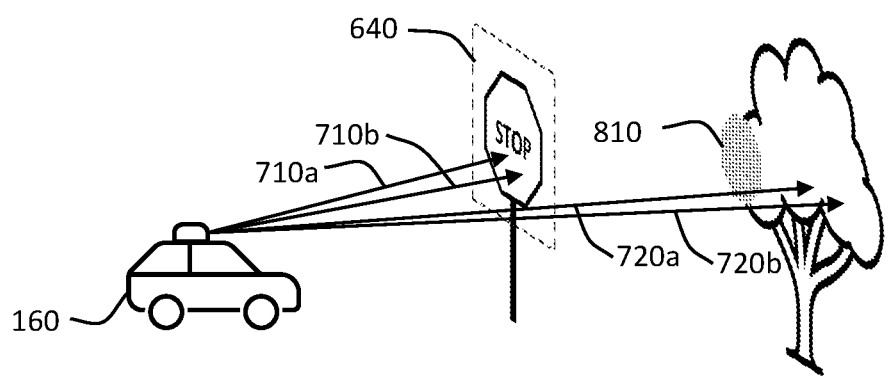
FIG. 8 is another view of the point cloud data collected by the mapping vehicle, according to some embodiments of the present disclosure.

FIG. 8 is another view of the point cloud data collected by the mapping vehicle, according to some embodiments of the present disclosure. The perspective illustrated in FIG. 8 shows that the stop sign and the tree are different distances from the mapping vehicle 160. FIG. 8 further illustrates a shadow region 810 of the stop sign on the tree; in this shadow region 810, rays that reflect off the stop sign (e.g., the rays 710a and 710b) do not reach the portion of the tree behind the stop sign.

The labeler identifies 540 one or more portions of the point cloud within the projected image region (e.g., the region 640) that correspond to the potential traffic control feature. The projected image may correspond to different portions of the point cloud, also referred to as different subgroups of points, that are at different distances relative to the mapping vehicle 160. For example, the subgroup of points in the point cloud that corresponds to the traffic control feature may be at or around one distance from the ranging sensor (e.g., the lidar sensor 220), while another subgroup of points that is near to the traffic control feature in the image may correspond to a different object (e.g., a tree or a building) that is at or around another distance from the sensor. The relative distances of different subgroups of the point cloud can be used to distinguish and identify traffic control features.

Figure 9:
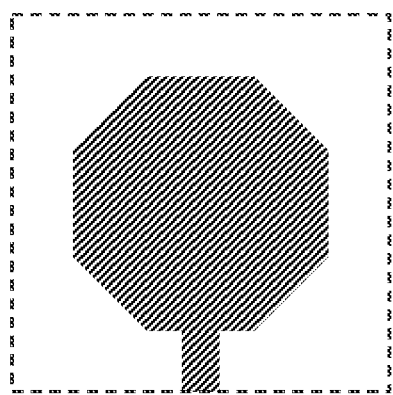
FIG. 9 is a first slice of the point cloud data of FIGS. 7 and 8, according to some embodiments of the present disclosure.
Figure 10:
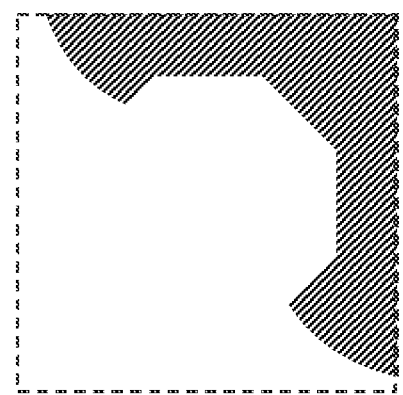
FIG. 10 is a second slice of the point cloud data of FIGS. 7 and 8, according to some embodiments of the present disclosure.

FIG. 9 is a first slice of the point cloud data of FIGS. 7 and 8. FIG. 9 illustrates a subgroup of points in the point cloud corresponding to the stop sign within the region 640. The subgroup of points are along a plane in the point cloud, and can be identified based on the three-dimensional shape (e.g., forming a roughly octagonal plane, or forming a substantially flat or planar surface), their distance from the mapping vehicle 160 (e.g., within a certain distance range from each other, e.g., one foot), or other geometric features. FIG. 10 is a second slice of the point cloud data of FIGS. 7 and 8. FIG. 10 illustrates a second subgroup of points of the point cloud that corresponds to the portion of the tree that is within the region 640 of the image. This second subgroup of points may be identified based on their having a similar distance from the mapping vehicle 160, as illustrated in FIG. 8.

While in the illustrations, the subgroups of points in FIGS. 9 and 10 are shown as being within a plane (i.e., the plane of the drawing page), if the subgroups of points include depth information (i.e., a dimension extending into and out of the page), the points in FIG. 9 may be arranged generally within a flat plane, because the stop sign is flat, whereas the points in FIG. 10 may not be arranged within a single plane, e.g., if the tree has leaves and branches with varying depths. The depth information may be utilized to distinguish traffic control features from other objects, as traffic control features may have expected depth characteristics (e.g., signs are generally flat or planar, while traffic lights may be substantially planar, but may have rounded areas near the bulbs and/or covers that extend over one or more of the bulbs).

Using the point cloud data, a traffic control feature (e.g., the stop sign) may be more clearly distinguished from its surroundings (e.g., the tree). In this example, the tree is a greater distance away from the mapping vehicle 160 from the stop sign, so the tree and the stop sign are grouped into different subgroups of points having different depths from the mapping vehicle 160. In addition, the subgroup of points identified as the traffic control feature (e.g., the points in FIG. 9) may be analyzed to determine whether the subgroup of points, including depth information, matches an expected three-dimensional shape of the particular traffic control feature (e.g., the flat, octagonal shape of a stop sign). Using the point cloud data together with the image data may provide superior object detection compared to using the image data alone or the point cloud data alone.

The labeler determines 550 a confidence metric for the identification of the traffic control feature. The confidence metric may be provided by a machine-learning model that outputs a confidence that the identified potential traffic control feature in the point cloud and/or the image corresponds to the traffic control feature. As another example, the confidence metric may be based on geometric features of the image and/or point cloud data, e.g., the proportion of the identified region (e.g., the region 640) that belongs to the slice corresponding to the traffic control feature (e.g., the slice shown in FIG. 9), where a higher proportion indicates a higher confidence. In some embodiments, the confidence metric may be based on data obtained at multiple locations relative to the potential traffic control feature, as described further below.

In some embodiments, the labeler uses additional data to determine or verify the traffic control feature, e.g., using one or more heuristics. For example, the stop sign labeler 490 may analyze vehicle behavior approaching an intersection to determine if vehicle behavior indicates the presence of a stop sign (e.g., whether speed data indicates that the mapping vehicle 160 slows down and stops when approaching an identified stop sign). As another example, if the traffic light labeler 480 identifies a potential traffic light, the traffic light labeler (or a component of the perception stack 450) may determine whether the potential traffic light contains an illuminated bulb within the determined boundary of the traffic light, e.g., a circular region or arrow shape having at least a threshold brightness. The presence of an illuminated bulb within the boundary of the traffic light can confirm the presence of a traffic light, whereas a traffic-light shaped area (e.g., a rectangular region) without an illuminated bulb is likely to not be a traffic light. In some embodiments, the traffic light labeler 480 may determine a color of the illuminated bulb, and the traffic light labeler 480 may compare the color with mapping vehicle behavior approaching the traffic light to determine whether the behavior of the mapping vehicle 160 (e.g., proceeding through the traffic light) matches the illuminated color (e.g., green).

The labeler determines 560 whether the traffic control feature is detected based on the calculated confidence. For example, if the confidence is below a certain threshold (e.g., below 0.2, or below 0.5), the process 500 may end 570 without identifying or labeling a traffic control feature. If the confidence is above a certain threshold (e.g., a confidence metric above 0.95 or 0.99, or a sufficiently high confidence metric in conjunction with one or more heuristics as described above), the labeler may proceed to determine 580 a position of the traffic control feature and label the traffic control feature at the determined position in the map database 430. The labeler may determine the position based on the point cloud and/or image data, along with the mapping sensor data 440 indicating a precise location of the mapping vehicle 160 at the time that the point cloud and image data was obtained.

If there is uncertainty regarding the identification of the traffic control feature, e.g., neither the criteria for labeling the traffic control feature nor ending the process are met, the labeler may move 590 to another point along the road, and in particular, a point closer to the potential traffic control feature. As noted above, the mapping sensor data 440 may include point cloud and image data (among other data) collected at various points along the road, e.g., every meter, every 2 meters, or every 5 meters. Alternatively, the data may be collected at time intervals, e.g., every second. The process returns to retrieving 510 mapping sensor data 440 captured at another location along the road, e.g., the next point for which data is available moving towards the intersection.

Figure 11:
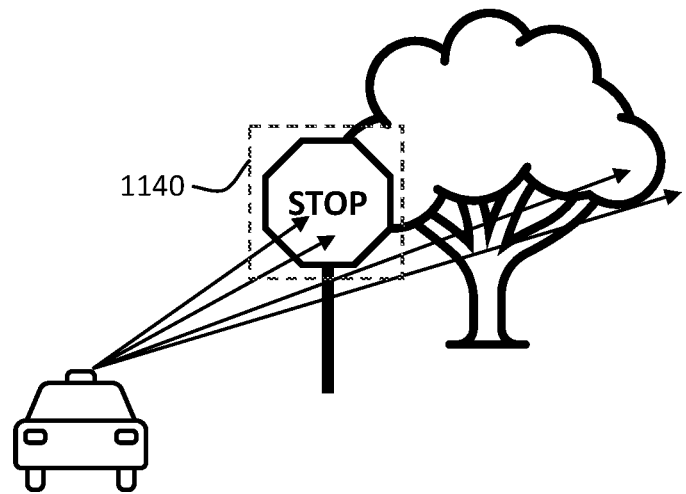
FIG. 11 is an example illustration of point cloud data collected by the mapping vehicle at a different location, according to some embodiments of the present disclosure.

FIG. 11 is an example illustration of point cloud data collected by the mapping vehicle at a different location, according to some embodiments of the present disclosure. Compared to FIG. 7, the mapping vehicle 160 is nearer to the stop sign and the tree. The mapping vehicle 160 has proceeded further along the road (compared to FIG. 7) and is also closer to the intersection, e.g., 2 meters or 5 meters closer than in FIG. 7. The change in the relative position of the mapping vehicle 160 and the stop sign may make the appearance of the stop sign clearer in the image data, which may improve object detection. Furthermore, the change in the relative positions of the mapping vehicle 160, the stop sign, and the tree may help distinguish the tree from the stop sign.

FIG. 11 further illustrates a region 1140 around the stop sign. The region 1140 may have been identified in the image data (e.g., using the object detection algorithm), and the region 1140 has been projected into the point cloud, as described above with respect to processes 520 and 530 and FIGS. 6 and 7. In this example, the boundaries of the region 1140 are tighter around the stop sign in FIG. 11 compared to FIGS. 6 and 7, e.g., the region 1140 includes less of a buffer area around the stop sign compared to the region 640. As noted above, as the mapping vehicle 160 moves closer to a traffic control feature (e.g., the stop sign), the portion of the image corresponding to the traffic control feature may be clearer, which may reduce the size of the buffer around the traffic control feature in the identified region.

Figure 12:
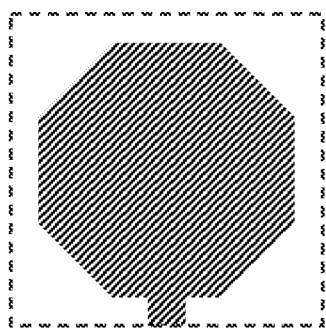
FIG. 12 is a first slice of the point cloud data of FIG. 11, according to some embodiments of the present disclosure.
Figure 13:
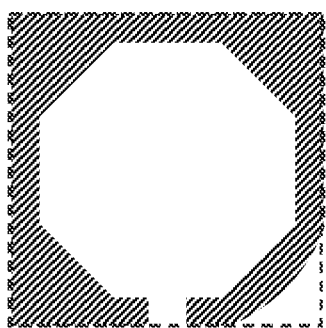
FIG. 13 is a second slice of the point cloud data of FIG. 11, according to some embodiments of the present disclosure.

FIGS. 12 and 13 illustrate two subgroups of the point cloud data of FIG. 11, where each subgroup or slice represents a subgroup of points in the point cloud at a particular distance or range of distances from the mapping vehicle 160. In particular, FIG. 12 illustrates a subgroup of points in the point cloud corresponding to the stop sign within the region 1140, and FIG. 13 illustrates a subgroup of points in the point cloud corresponding to the portion of the tree that is within the region 1140. Each subgroup of points in FIGS. 12 and 13 may be identified as described with respect to FIGS. 9 and 10, e.g., based on distances of the points from the mapping vehicle 160, where the points in FIG. 12 fall within a group or range of distances, and the points of FIG. 13 fall within a different group or range of distances.

Notably, the subgroup of points in FIG. 12 is similar to the subgroup of points in FIG. 9, e.g., both subgroups of points are arranged in an octagonal shape. As noted above, the subgroups of points may include depth information (not specifically illustrated in FIGS. 12 and 13), and the points in FIG. 12 may be substantially within a plane. The labeler may look for a consistent shape in the subgroup of points representing a traffic control feature across multiple sets of data obtained at different positions, where the shape consistently matches an expected shape for the traffic control feature. For example, the stop sign labeler 490 may look for a consistent shape across multiple subgroups of points corresponding to the stop sign, where each subgroup is from a point cloud obtained at a different time and/or position relative to the stop sign (e.g., the subgroup in FIG. 9 and the subgroup in FIG. 12). By contrast, the subgroup of points in FIG. 13 is quite different from the subgroup of points in FIG. 10, as the relative position of the tree and the stop sign changes based on the viewpoint of the mapping vehicle 160. The change in the perceived data describing the tree behind the stop sign can help distinguish the tree from the stop sign.

The confidence metric may be recomputed based on the point cloud subgroups obtained at the next position along the road, and the new confidence metric may be used to determine 560 whether or not to confirm the traffic control feature, or to move to a further point along the road. As noted above, the confidence metric may be determined based on data obtained at multiple locations relative to the potential traffic control feature, e.g., the confidence metric may be computed based on the subgroup shown in FIG. 12 as well as the subgroup shown in FIG. 9. For example, the confidence metric may be based on the similarity of the image and/or point cloud data describing the potential traffic control feature at different positions along the roadway, or by a decreasing buffer size around the potential traffic control feature.

Example Process for Detecting Intersections

Figure 14:
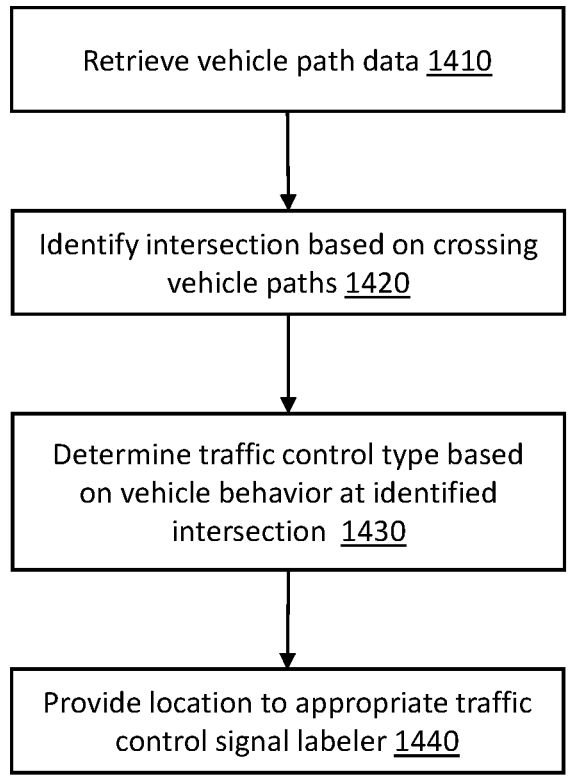
FIG. 14 is a flow chart of a process for identifying intersections based on captured sensor data, according to some embodiments of the present disclosure.
Figure 15:
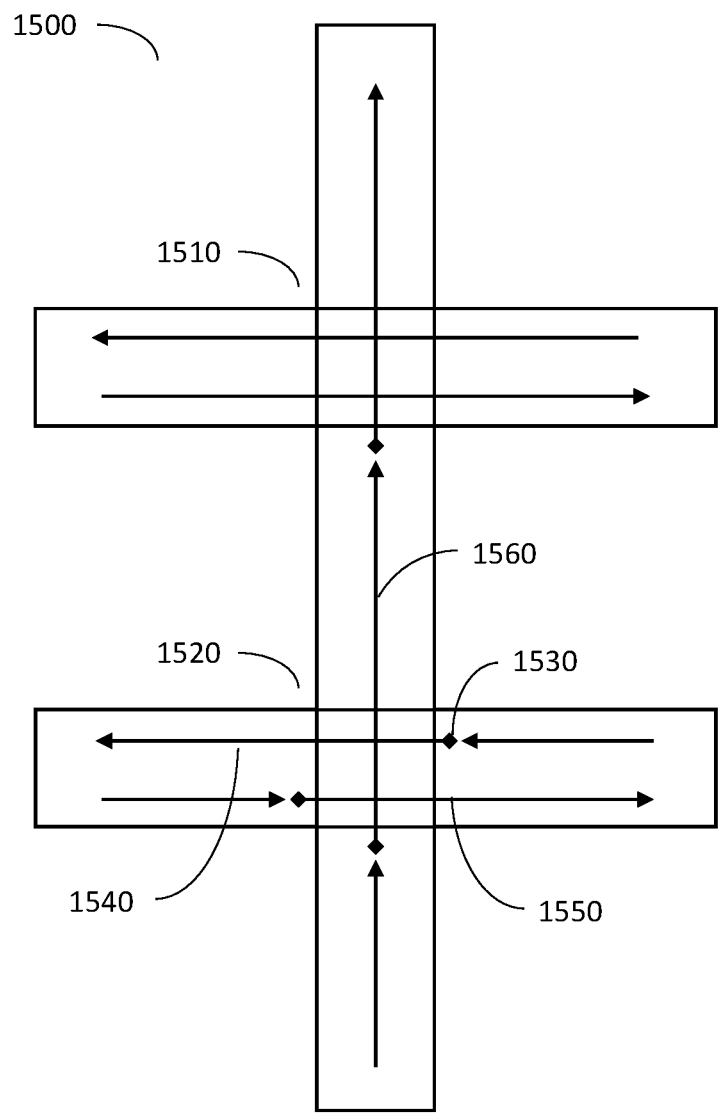
FIG. 15 is an example illustration of sensor data used to identify intersection locations and potential intersection types, according to some embodiments of the present disclosure.
Figure 15:
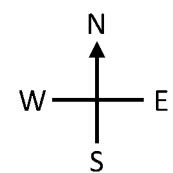

FIG. 14 is a flow chart of a process 1400 for identifying intersections based on captured sensor data, according to some embodiments of the present disclosure. The process 1400 may be performed by the intersection detector 460 based on mapping sensor data 440. FIG. 15 helps illustrate the mapping sensor data and the process for identifying intersection locations and potential intersection types.

The intersection detector 460 retrieves vehicle path data, e.g., data describing the locations and speeds of mapping vehicles driving in a particular region. The intersection detector 460 may retrieve the vehicle path data from the mapping sensor data 440; the vehicle path data may include the locations and speeds captured by the sensor suite 200, as described with respect to FIG. 2.

FIG. 15 illustrates several vehicle paths around two intersections 1510 and 1520. Each path is represented by an arrow. A dot (e.g., the dot 1530 of the arrow 1540) indicates a position where a mapping vehicle 160 stopped, and the line represents motion. As noted above, speed data (e.g., a speed at each point along the path, or certain points along the path) may also be retrieved, but is not illustrated for simplicity. The paths illustrated in FIG. 15 may have been obtained by one mapping vehicle 160 (e.g., a mapping vehicle that crossed the intersections 1510 and 1520 from multiple directions) or by multiple mapping vehicles.

The intersection detector 460 identifies 1420 an intersection based on crossing vehicle paths. For example, at the intersection 1520, the path 1560 crosses the paths 1540 and 1550. The paths 1540 and 1550 do not cross; without the path 1560, the intersection detector 460 may not detect the intersection 1520. The intersection detector 460 may determine that the path 1560 crossing the paths 1540 and 1550 represents a single intersection, where the paths 1540 and 1550 are along the same road, rather than two distinct intersections, based on the proximity of the paths 1540 and 1550, additional road or lane data, or other features.

In some embodiments, the intersection detector 460 determines 1430 a likely traffic control type based on vehicle behavior at the identified intersection. For example, at the intersection 1520, the paths indicate that each vehicle approaching the intersection 1520 comes to a stop before crossing the intersection. This may indicate that the intersection 1520 is likely to be a three-way stop (if the roadway along path 1560 is a one-way street), where a stop sign is expected to be positioned at each entry point to the intersection 1520. In the example intersection 1510, the paths extending across left-to-right and right-to-left in the illustration do not come to a stop, whereas the path 1560 does stop before entering the intersection. This may indicate that this intersection 1510 is controlled by a traffic light or a one-way stop.

The intersection detector 460 may then provide 1440 the location of a detected intersection to an appropriate traffic control labeler. For example, the intersection detector 460 may provide data describing the intersection 1520 (e.g., the location of the intersection, mapping sensor data related to the intersection) to the stop sign labeler 490, since the intersection 1520 is likely to be controlled by stop signs. If the stop sign labeler 490 does not identify a stop sign, the intersection detector 460 or the traffic control feature ID system 470 may execute one or more additional labeling modules, e.g., the traffic light labeler 480, to potentially identify a different traffic control feature.

SELECT EXAMPLES

Example 1 provides a computer implemented method for identifying a traffic control feature, the method including identifying, in a two-dimensional image obtained at a particular location on a roadway, a group of points; projecting the group of points onto a three-dimensional point cloud obtained at the particular location on the roadway, where each point of the group of points has a respective depth relative to the particular location on the roadway; identifying a subgroup of points of the group of points based on the depths of the points in the group of points; determining that the subgroup of points corresponds to a particular traffic control feature; and determining a location of the particular traffic control feature along the roadway based on a position in three-dimensional space of the subgroup of points.

Example 2 provides the method of example 1, where the subgroup of points is a first subgroup of points, and determining that the subgroup of points corresponds to the particular traffic control feature includes identifying, in a second two-dimensional image obtained at a second location on the roadway, a second group of points; projecting the second group of points onto a second three-dimensional point cloud obtained at the second location on the roadway; identifying a second subgroup of points based on the depths of the points in the second group of points; and determining that the second subgroup of points substantially corresponds to the first subgroup of points.

Example 3 provides the method of example 2, further including calculating a first confidence that the first subgroup of points corresponds to the particular traffic control feature; calculating a second confidence that the second subgroup of points corresponds to the particular traffic control feature; and determining that the second confidence exceeds a threshold confidence.

Example 4 provides the method of any of the preceding examples, where the two-dimensional image and the point cloud are obtained from a vehicle traveling along the roadway when the vehicle is at the particular location.

Example 5 provides the method of example 4, where the vehicle includes a camera to capture the two-dimensional image and a lidar sensor to capture the point cloud.

Example 6 provides the method of any of the preceding examples, where the depths of the points in the identified subgroup of points represent a substantially flat surface.

Example 7 provides the method of any of the preceding examples, further including selecting the particular location on the roadway to identify the particular traffic control feature, the particular location on the roadway proximate to an intersection, and the two-dimensional image and the three-dimensional point cloud representing at least a portion of the intersection.

Example 8 provides the method of example 7, further including retrieving data representing pathways driven by a plurality of vehicles; and identifying the intersection based on the data representing pathways, where at least two pathways represented in the data cross at the intersection.

Example 9 provides the method of any of the preceding examples, where the particular traffic control feature is a stop sign, where determining that the subgroup of points corresponds to the particular traffic control feature includes accessing data describing vehicle behavior of a vehicle approaching the stop sign; and determining that the vehicle behavior indicates that the vehicle stopped at a position proximate to the stop sign.

Example 10 provides the method of any of examples 1-8, where the particular traffic control feature is a traffic light, the method further including determining a boundary of the traffic light; and identifying at least one bulb within the boundary of the traffic light.

Example 11 provides a non-transitory computer-readable medium storing instructions that, when executed by a processor, cause the processor to identify, in a two-dimensional image obtained at a particular location on a roadway, a group of points; project the group of points onto a three-dimensional point cloud obtained at the particular location on the roadway, where each point of the group of points has a respective depth relative to the particular location on the roadway; identify a subgroup of points of the group of points based on the depths of the points in the group of points; determine that the subgroup of points corresponds to a particular traffic control feature; and determine a location of the particular traffic control feature along the roadway based on a position in three-dimensional space of the subgroup of points.

Example 12 provides the computer-readable medium of example 11, where the subgroup of points is a first subgroup of points, and determining that the subgroup of points corresponds to the particular traffic control feature includes identifying, in a second two-dimensional image obtained at a second location on the roadway, a second group of points; projecting the second group of points onto a second three-dimensional point cloud obtained at the second location on the roadway; identifying a second subgroup of points based on the depths of the points in the second group of points; and determining that the second subgroup of points substantially corresponds to the first subgroup of points.

Example 13 provides the computer-readable medium of example 11 or 12, where the two-dimensional image and the point cloud are obtained from a vehicle traveling along the roadway when the vehicle is at the particular location, the vehicle including a camera to capture the two-dimensional image and a lidar sensor to capture the point cloud.

Example 14 provides the computer-readable medium of any of examples 11-13, where the depths of the points in the identified subgroup of points represent a substantially flat surface.

Example 15 provides the computer-readable medium of any of examples 11-14, where the instructions further cause the processor to select the particular location on the roadway to identify the particular traffic control feature, the particular location on the roadway proximate to an intersection, and the two-dimensional image and the three-dimensional point cloud representing at least a portion of the intersection.

Example 16 provides a system including a database storing image data and point cloud data obtained by a vehicle traveling along a roadway; and computer circuitry to identify, in the image data, a group of points; project the group of points onto point cloud data obtained at a same position on the roadway as the image data, where each point of the group of points has a respective depth relative to the position on the roadway; identify a subgroup of points of the group of points based on the depths of the points in the group of points; determine that the subgroup of points corresponds to a particular traffic control feature; and determine a location of the particular traffic control feature along the roadway based on a position in three-dimensional space of the subgroup of points.

Example 17 provides the system of example 16, where the subgroup of points is a first subgroup of points, the computer circuitry further to identify, in a second image obtained at a second location on the roadway, a second group of points; project the second group of points onto a second point cloud obtained at the second location on the roadway; identify a second subgroup of points based on the depths of the points in the second group of points; and determine that the second subgroup of points substantially corresponds to the first subgroup of points.

Example 18 provides the system of example 16 or 17, where the vehicle includes a camera to capture image data and a lidar sensor to capture the point cloud data.

Example 19 provides the system of any of examples 16-18, where the depths of the points in the identified subgroup of points represent a substantially flat surface.

Example 20 provides the system of any of examples 16-19, the compute circuitry further to select a particular location on the roadway to identify the particular traffic control feature, the particular location on the roadway proximate to an intersection, and the image data and the point cloud data representing at least a portion of the intersection.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A computer implemented method for identifying a traffic control feature, the method comprising:
    identifying, in a two-dimensional image obtained at a particular location on a roadway, a group of points;
    projecting the group of points onto a three-dimensional point cloud obtained at the particular location on the roadway, wherein each point of the group of points has a respective depth relative to the particular location on the roadway;
    identifying a subgroup of points of the group of points based on the depths of the points in the group of points;
    determining that the subgroup of points corresponds to a particular traffic control feature; and determining a location of the particular traffic control feature along the roadway based on a position in three-dimensional space of the subgroup of points.

2. The method of claim 1, wherein the subgroup of points is a first subgroup of points, and determining that the subgroup of points corresponds to the particular traffic control feature comprises:
identifying, in a second two-dimensional image obtained at a second location on the roadway, a second group of points;
projecting the second group of points onto a second three-dimensional point cloud obtained at the second location on the roadway;
identifying a second subgroup of points based on the depths of the points in the second group of points; and
determining that the second subgroup of points substantially corresponds to the first subgroup of points.

3. The method of claim 2, further comprising:
calculating a first confidence that the first subgroup of points corresponds to the particular traffic control feature;
calculating a second confidence that the second subgroup of points corresponds to the particular traffic control feature; and
determining that the second confidence exceeds a threshold confidence.

4. The method of claim 1, wherein the two-dimensional image and the point cloud are obtained from a vehicle traveling along the roadway when the vehicle is at the particular location.

5. The method of claim 4, wherein the vehicle comprises a camera to capture the two-dimensional image and a light detection and ranging (LIDAR) sensor to capture the point cloud.

6. The method of claim 1, wherein the depths of the points in the identified subgroup of points represent a substantially flat surface.

7. The method of claim 1, further comprising selecting the particular location on the roadway to identify the particular traffic control feature, the particular location on the roadway proximate to an intersection, and the two-dimensional image and the three-dimensional point cloud representing at least a portion of the intersection.

8. The method of claim 7, further comprising:
retrieving data representing pathways driven by a plurality of vehicles; and
identifying the intersection based on the data representing pathways, wherein at least two pathways represented in the data cross at the intersection.

9. The method of claim 1, wherein the particular traffic control feature is a stop sign, wherein determining that the subgroup of points corresponds to the particular traffic control feature comprises:
accessing data describing vehicle behavior of a vehicle approaching the stop sign; and
determining that the vehicle behavior indicates that the vehicle stopped at a position proximate to the stop sign.

10. The method of claim 1, wherein the particular traffic control feature is a traffic light, the method further comprising:
determining a boundary of the traffic light; and
identifying at least one bulb within the boundary of the traffic light.

11. A non-transitory computer-readable medium storing instructions that, when executed by a processor, cause the processor to:
identify, in a two-dimensional image obtained at a particular location on a roadway, a group of points;
project the group of points onto a three-dimensional point cloud obtained at the particular location on the roadway, wherein each point of the group of points has a respective depth relative to the particular location on the roadway;
identify a subgroup of points of the group of points based on the depths of the points in the group of points;
determine that the subgroup of points corresponds to a particular traffic control feature; and
determine a location of the particular traffic control feature along the roadway based on a position in three-dimensional space of the subgroup of points.

12. The computer-readable medium of claim 11, wherein the subgroup of points is a first subgroup of points, and determining that the subgroup of points corresponds to the particular traffic control feature comprises:
identifying, in a second two-dimensional image obtained at a second location on the roadway, a second group of points;
projecting the second group of points onto a second three-dimensional point cloud obtained at the second location on the roadway;
identifying a second subgroup of points based on the depths of the points in the second group of points; and
determining that the second subgroup of points substantially corresponds to the first subgroup of points.

13. The computer-readable medium of claim 11, wherein the two-dimensional image and the point cloud are obtained from a vehicle traveling along the roadway when the vehicle is at the particular location, the vehicle comprising a camera to capture the two-dimensional image and a light detection and ranging (LIDAR) sensor to capture the point cloud.

14. The computer-readable medium of claim 11, wherein the depths of the points in the identified subgroup of points represent a substantially flat surface.

15. The computer-readable medium of claim 11, wherein the instructions further cause the processor to select the particular location on the roadway to identify the particular traffic control feature, the particular location on the roadway proximate to an intersection, and the two-dimensional image and the three-dimensional point cloud representing at least a portion of the intersection.

16. A system comprising:
a database storing image data and point cloud data obtained by a vehicle traveling along a roadway; and
computer circuitry to:
identify, in the image data, a group of points;
project the group of points onto point cloud data obtained at a same position on the roadway as the image data, wherein each point of the group of points has a respective depth relative to the position on the roadway;
identify a subgroup of points of the group of points based on the depths of the points in the group of points;
determine that the subgroup of points corresponds to a particular traffic control feature; and
determine a location of the particular traffic control feature along the roadway based on a position in three-dimensional space of the subgroup of points.

17. The system of claim 16, wherein the subgroup of points is a first subgroup of points, the computer circuitry further to:
identify, in a second image obtained at a second location on the roadway, a second group of points;

project the second group of points onto a second point cloud obtained at the second location on the roadway;

identify a second subgroup of points based on the depths of the points in the second group of points; and determine that the second subgroup of points substantially corresponds to the first subgroup of points.

18. The system of claim 16, wherein the vehicle comprises a camera to capture image data and a light detection and ranging (LIDAR) sensor to capture the point cloud data.

19. The system of claim 16, wherein the depths of the points in the identified subgroup of points represent a substantially flat surface.

20. The system of claim 16, the compute circuitry further to select a particular location on the roadway to identify the particular traffic control feature, the particular location on the roadway proximate to an intersection, and the image data and the point cloud data representing at least a portion of the intersection.

* * * * *